Patented May 10, 1949

2,469,695

UNITED STATES PATENT OFFICE 2,469,695

NITROAMINOBENZENE ESTER COMPOUNDS

James G. McNally, Kingsport, Tenn., and Joseph B. Dickey, Rochester, N. Y., assignors to Eastman Kodak Company, Rochester, N. Y., a corporation of New Jersey No Drawing. Application February 2, 1946, Serial No. 645,230

4 Claims. (Cl. 260—490)

This invention relates to new non-sulfonated nitroaminobenzene ester compounds and their application to the art of dyeing or coloring.

The compounds of our invention constitute valuable dyes for the coloration of textile materials prepared from organic derivatives of cellulose, wool, silk, nylon and Vinyon. They are also useful for the coloration of lacquers made from or containing organic derivatives of cellulose, and polymeric materials prepared from compounds containing the —C=C— group. The compounds of our invention are especially suited for the coloration of cellulose acetate textile materials.

We are aware that it is known to make nitroarylamine dye compounds. However, so far as we are aware, the compounds of our invention are novel and as they do not sublime they are free from one of the difficulties commonly encountered by dyers when attempting to employ the known nitroarylamine dyes for dyeing. Also the dye compounds of our invention yield yellow shades which possess superior light fastness properties. Further, they have good tinctorial power and are readily applied to the materials above named.

The new non-sulfonated nitroaminobenzene ester compounds of our invention have the general formula:

$$B-N(H)-C(R)(R_1)(R_2)$$

wherein B represents a mono nitrated non-sulfonated monocyclic benzene nucleus which can have one more substituent other than an additional nitro group or a sulfonic acid group, R, R₁ and R₂ each represent a member selected from the group consisting of a low carbon alkyl group, a methylol group, a

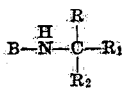

group, a

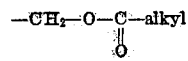

group, a

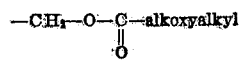

group, a

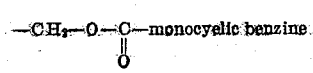

group, a

—CH₂—O—C(=O)—furyl group, and a

—CH₂—O—C(=O)—O—alkyl group, and R₁ may be in addition hydrogen and wherein at least one of the members R, R₁ and R₂ must be a member selected from the group consisting of a —CH₂—O—C(=O)—alkyl group, a —CH₂—O—C(=O)—alkoxyalkyl group, a —CH₂—O—C(=O)—monocyclic benzene group, a —CH₂—O—C(=O)—furyl group and a —CH₂—O—C(=O)—O—alkyl group.

The new non-sulfonated nitroaminobenzene ester compounds of our invention can be prepared by treating the non-sulfonated nitroaminobenzene compounds having the general formula:

wherein B represents a mono nitrated non-sulfonated monocyclic benzene nucleus which can have one more substituent other than an additional nitro group or a sulfonic acid group, X and X₂ each represent a member selected from the group consisting of a low carbon alkyl group and a methylol group, X₁ represents a member selected from the group consisting of hydrogen, a low carbon alkyl group and a methylol group and wherein at least one of the members X, X₁ and X₂ must be a methylol group, with a suitable esterifying agent. Only one nitro group should be present on the benzene nucleus B because we have discovered that dyeings obtained with compounds wherein B has two nitro groups possess poor light fastness properties.

The compounds having the general formula:

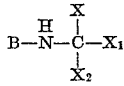

can be prepared by reacting a monocyclic non-sulfonated mono nitro chlorobenzene which can have one more substituent, other than an additional nitro group or a sulfonic acid group, with a primary amine having the formula:

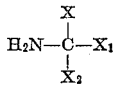

X, $X_1$, and $X_2$ have the meaning previously assigned to them.

Primary amines of the formula

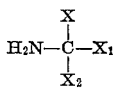

include, for example, 2-aminopropanediol-1,3

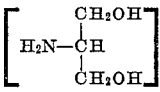

2-amino-2-methyl propanediol-1,3

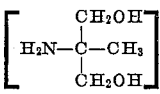

2-amino-2-ethyl propanediol-1,3

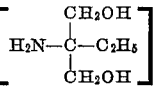

trimethylol methylamine

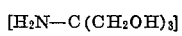

2-amino-2-(n-propyl)-propanediol-1,3

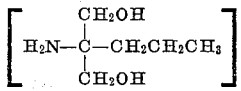

2-amino-2-(n-butyl)-propanediol-1,3; 2-amino-2-methylol-n-butane

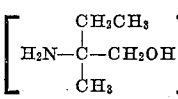

and 2-amino-1-methylol-n-butane

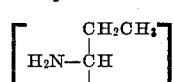

Monocyclic non-sulfonated mono nitro chlorobenzene compounds which can be employed in the preparation of the compounds of our invention include, for example, 2,5-dichloro-1-nitrobenzene, 2-chloro-1-nitrobenzene, 2-chloro-5-fluoro-1-nitrobenzene, 2,3-dichloro-1-nitrobenzene, 4-chloro-1-nitrobenzene, 2-chloro-5-methylsulfone-1-nitrobenzene, 2-chloro-5-methyl-1-nitrobenzene, 5-aceto-2-chloro-1-nitrobenzene, 2,3-dichloro-5-methoxy-1-nitrobenzene, 2-chloro-1-nitro-5-trifluoromethylbenzene, 2-chloro-5-N-ethylsulfoneamide-1-nitrobenzene, 2-chloro-5-methoxy-1-nitrobenzene, 2,3-dichloro-5-(N,N-dimethyl)-sulfoneamide-1-nitrobenzene, 2-chloro-5-cyano-1-nitrobenzene, 2-chloro-1-nitro-5-thiocyanobenzene, 5-acetamino-2-chloro-1-nitrobenzene, 2-chloro-5-hydroxy-1-nitrobenzene, 2-chloro-1-nitro-5-sulfone-amidobenzene and 2-chloro-5-ethylsulfone-1-nitrobenzene.

Esterifying agents that can be employed in the preparation of the compounds of our invention include, for example, acetic anhydride, propionic anhydride, butyric anhydride, valeric anhydride, n-caproic anhydride, n-caprylic anhydride, N-lauryl anhydride, acetyl chloride, n-propionyl chloride, n-butyryl chloride, isobutyryl chloride, n-valeryl chloride, isovaleryl chloride, n-caproyl chloride, n-lauryl chloride, n-palmityl chloride, benzoic anhydride, benzoyl chloride, p-nitrobenzoyl chloride, o-nitrobenzoyl chloride, m-nitrobenzoyl chloride, o-toluyl chloride, p-toluyl chloride, furoyl chloride, tetrahydrofuroyl chloride, β-methoxyacetyl chloride ($ClCOCH_2OCH_3$), β-ethoxyacetyl chloride ($ClCOCH_2OC_2H_5$), ethyl chlorocarbonate (ethyl chloroformate), methyl chloroformate and n-propyl chloroformate ($ClCOOCH_2CH_2CH_3$).

The following examples illustrate our new dye compounds and the manner of their preparation.

*Example 1*

19.2 grams of 2,5-dichloronitrobenzene, 50 cc. of butanol, 10.5 grams of 2-amino-2-methylpropanediol-1,3 and 5.5 grams of sodium carbonate were placed in a suitable reaction vessel and refluxed together for 22–23 hours. The reaction mixture was then steam distilled and the distillate was cooled to room temperature and filtered. Three grams of 5-chloro-2-(2-imino-2-methylpropanediol-1,3)-1-nitrobenzene, having the formula

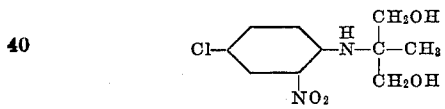

were obtained.

19.2 grams of 2,5-dichloronitrobenzene, 9.2 grams of sodium bicarbonate, 10.9 grams of 2-amino-2-methylpropanediol-1,3 and 50 cc. of butanol were placed in a suitable reaction vessel and refluxed together for 32 hours. The reaction mixture was then steam distilled and the distillate was cooled to room temperature and filtered. 2.9 grams of 5-chloro-2-(2-amino-2-methylpropanediol-1,3)-1-nitrobenzene were obtained.

19.2 grams of 2,5-dichloronitrobenzene, 5.8 grams of sodium carbonate, 10.9 grams of 2-amino-2-methylpropanediol-1,3 and 50 cc. of amyl alcohol were placed in a suitable reaction vessel and refluxed together for 12 hours. The reaction mixture was then steam distilled and the distillate was cooled to room temperature and filtered. 1.5 grams of 5-chloro-2-(2-imino-2-methyl-propanediol-1,3)-1-nitrobenzene were obtained.

Seven grams of 5-chloro-2-(2-imino-2-methylpropanediol-1,3)-1-nitrobenzene obtained from the runs described above were dissolved in 25 cc. of boiling ethyl alcohol and the resulting solution was filtered while hot and cooled to room temperature to recrystallize the 5-chloro-2-(2-imino-2-methylpropanediol-1,3)-1-nitrobenzene. The first four grams crystallizing out were recovered and had a melting point of 161°–164° C.

The four grams of 5-chloro-2-(2-imino-2-methyl-propanediol-1,3)-1-nitrobenzene, obtained as described above, were placed in a suitable reaction vessel and heated for 1½ hours on an oil bath with 10 cc. of glacial acetic acid and 10 cc. of acetic anhydride. The reaction mixture resulting from this treatment was then poured into cold water to precipitate the diacetic acid ester of 5-chloro-2-(2-imino-2-methylpropanediol-1,3)-1-nitrobenzene

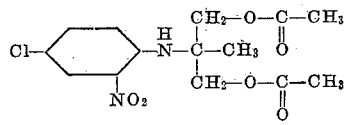

which was recovered by filtration. Upon recrystallization from ethyl alcohol and water a yield of 4.8 grams of the desired product, having a melting point of 57°–59° C. was obtained.

*Example 2*

13.2 grams of 2-chloro-5-N-ethylsulfoneamide-1-nitrobenzene, 5.2 grams of 2-amino-2-methylpropanediol-1,3 and 2.8 grams of sodium carbonate were placed in a suitable reaction vessel and heated together on an oil bath for six hours at 170° C. Considerable foaming, indicating reaction, took place during this heating. Ethyl alcohol was added to the reaction mixture to dissolve the 2-(2-imino-2-methylpropanediol-1,3)-5-N-ethylsulfoneamide - 1 - nitrobenzene formed in the reaction. The reaction mixture was then poured into cold dilute aqueous hydrochloric acid with stirring. The yellow precipitate which formed was recovered by filtration and washed with water. The yellow precipitate consisting essentially of 2-(2-imino-2-methylpropanediol - 1,3) - 5 - N-ethylsulfoneamide-1-nitrobenzene became gummy on standing but crystallized after standing over night.

The 2-(2-imino-2 - methylpropanediol-1,3)-5-N-ethyl-sulfoneamide-1-nitrobenzene obtained as described above, was placed in a suitable reaction vessel together with sufficient acetic anhydride to acetylate the methylol groups and the reaction mixture was heated on a steam bath for two hours following which it was poured into ice water. The diacetic acid ester of 2-(2-imino-2-methylpropanediol-1,3) -5-N-ethylsulfoneamide-1-nitrobenzene,

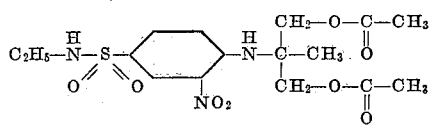

formed was recovered by filtration, washed with water and dried.

*Example 3*

26 grams of 5-chloro-2-(2-imino-2-methylpropanediol-1,3)-1-nitrobenzene are dissolved in 200 cc. of pyridine and 11 grams of glacial acetic acid are added dropwise at room temperature over a period of several hours. The reaction mixture is then heated to 50° C. and maintained at this temperature for 30 minutes following which it is evaporated to dryness under reduced pressure. The yellow product obtained thereby and having the formula:

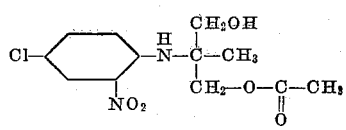

is crystallized from ethyl alcohol. It colors cellulose acetate greenish-yellow shades.

*Example 4*

26 grams of 5-chloro-2-(iminopropanediol-1,3)-1-nitrobenzene are dissolved in 200 grams of pyridine and 23 grams of ethyl chlorocarbonate are added at room temperature. The reaction which takes place is completed by warming. Then enough aqueous sodium bicarbonate solution is added to neutralize the hydrochloric acid present in the reaction mixture. The pyridine present in the reaction mixture is removed by distillation under reduced pressure (2 mm., for example), water is added to the reaction mixture and the precipitated yellow solid having the formula:

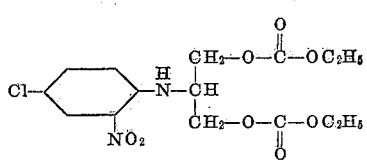

is recovered by filtration, washed with water and dried.

*Example 5*

10 grams of 4-(2-iminopropanediol-1,3)-1-nitrobenzene are placed in a suitable reaction vessel, cooled to 15° C. and 0.2 gram molecular weight of acetic anhydride diluted with 25 cc. of glacial acetic acid are added. If desired, a drop of sulfuric acid may be used as a catalyst. The reaction mixture is warmed slightly and then poured into water. A yellow solid having the formula:

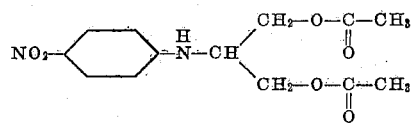

is recovered by filtration, washed with water and dried. It may be further purified by crystallization from ethyl alcohol if desired.

4 - (2-iminopropanediol-1,3)-1-nitrobenzene is prepared by reacting one molecular equivalent weight of p-nitrochlorobenzene with two of 2-aminopropanediol-1,3 in accordance with the general procedure indicated hereinbefore.

*Example 6*

15.6 grams of o-nitrochlorobenzene, 12 grams of trimethylol methylamine and 6 grams of sodium carbonate are placed in a suitable reaction vessel and heated at 140° C. with stirring until no more carbon dioxide is evolved. The reaction product is then poured into water and the reddish gummy solid that separates is recovered by filtration and crystallized from a solvent such as ethyl alcohol, butanol, acetic acid or 1,4-dioxane. 2-(2-iminopropanetriol-1,2,3)-1-nitrobenzene having the formula:

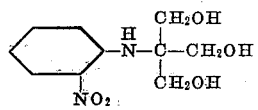

is obtained.

The reaction product obtained as described above is dissolved in pyridine and treated with 3.5 molecular equivalents of benzoyl chloride at room temperature. The esterification reaction which takes place is completed by warming. The desired product having the formula:

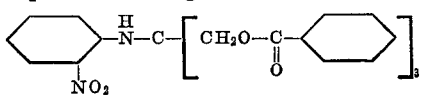

is obtained on working up the reaction mixture in accordance with the procedure described in Example 4.

*Example 7*

26 grams of 5-chloro-2-(2-iminopropanediol-1,3)-1-nitrobenzene are dissolved in 200 grams of pyridine and 23 grams of β-methoxyacetylchloride are added at room temperature. The reaction which takes place is completed by warming. Then enough aqueous sodium bicarbonate solution is added to neutralize the hydrochloric acid present in the reaction mixture. The pyridine present in the reaction mixture is removed by distillation under reduced pressure (10 mm., for example), water is added to the reaction mixture and the product having the formula:

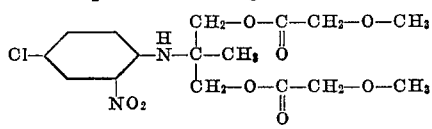

is recovered by filtration, washed with water and dried.

*Example 8*

13.2 grams of 2-chloro-5-N-ethylsulfoneamide-1-nitrobenzene, 6 grams of trimethylol methylamine and 2.8 grams of sodium carbonate were placed in a suitable reaction vessel and heated together on an oil bath for 6 hours at 170° C. Considerable foaming, indicating reaction, took place during this heating. Ethyl alcohol was added to the reaction mixture to dissolve the 2-(2 - iminopropanetriol - 1,2,3)-5-N-ethylsulfoneamide-1-nitrobenzene formed in the reaction. The reaction mixture was then poured into cold dilute aqueous hydrochloric acid with stirring. The yellow precipitate which formed was recovered by filtration and washed with water. The yellow precipitate consisting essentially of 2-(2-iminopropanetriol-1,2,3)-5 - N - ethyl - sulfone - amide-1-nitrobenzene became gummy on standing but crystallized after standing over night. The product obtained as described above was placed in a suitable reaction vessel together with sufficient acetic anhydride to acetylate the methylol groups and the reaction mixture was heated on a steam bath for two hours following which it was poured into ice water. The precipitate formed was recovered by filtration, washed with water and dried. It has the formula:

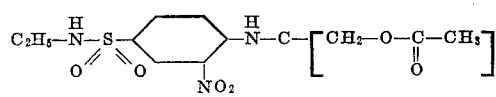

and can be further purified by dissolving in ethyl alcohol and precipitating by evaporation of the alcohol.

*Example 9*

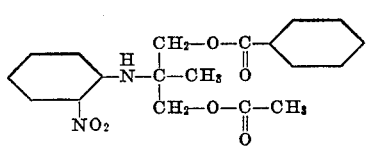

This compound can be obtained by preparing the mono acetic ester of 2-(2-imino-2-methylpropanediol-1,3)-1-nitrobenzene in accordance with the general procedure described in Example 3 and treating the mono acetic ester compound with benzoyl chloride in accordance with the general procedure described in Example 6.

*Example 10*

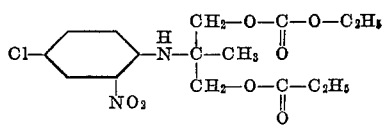

This compound can be obtained by preparing the monopropionic ester of 5-chloro-2-(2-imino-2 - methylpropanediol - 1,3) - 1 - nitrobenzene by treating 2,5-dichloronitrobenzene with an amount of propionic anhydride slightly in excess of that theoretically required to introduce one propionic ester group in accordance with the general procedure set forth in Example 3 and treating the compound so obtained with ethyl chlorocarbonate in accordance with the general procedure described in Example 4.

*Example 11*

Mono acetic ester of 5-chloro-2-(2-iminopropanetriol-1,2,3)-1-nitrobenzene. This compound can be obtained by reacting 26 grams of 5-chloro-2-(2-iminopropanetriol-1,2,3) - 1 - nitrobenzene with 11 grams of acetic anhydride in accordance with the general procedure described in Example 3. It has the formula:

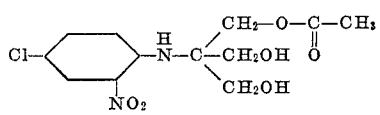

Similarly in accordance with the general procedure described hereinbefore the following compounds can be prepared:

1. 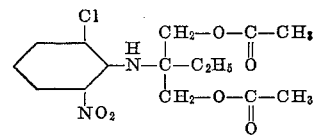

2. 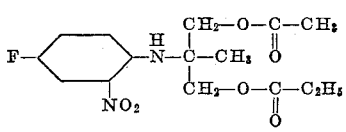

3. 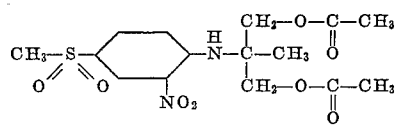

4. 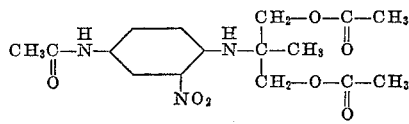

5. 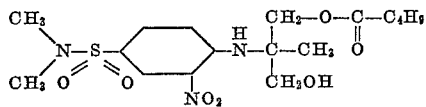

6. 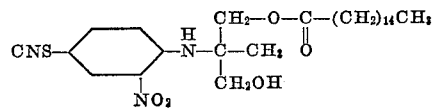

7. 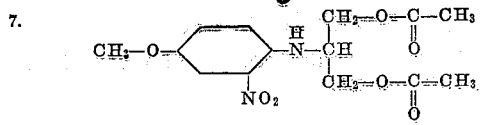

8. 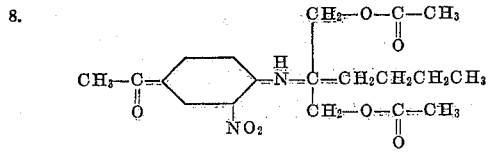

9. 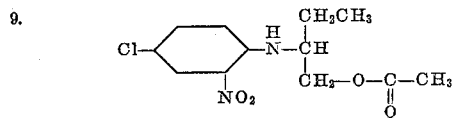

10. 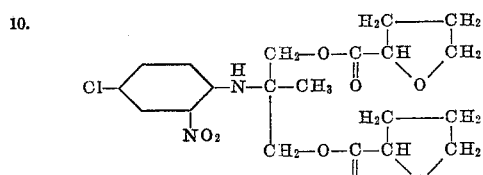

11. 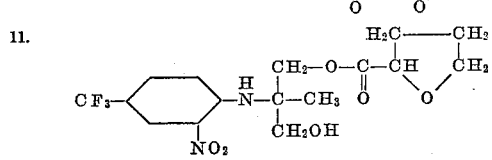

12. 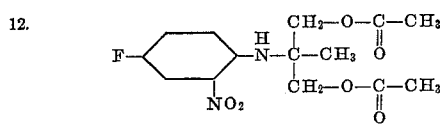

13. 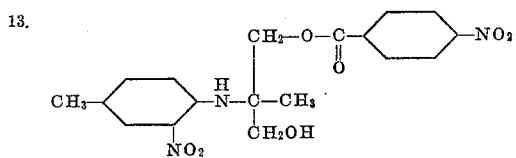

14. 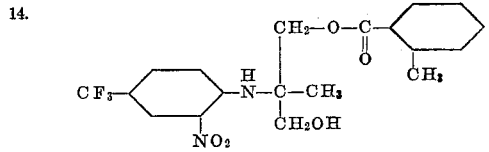

15. 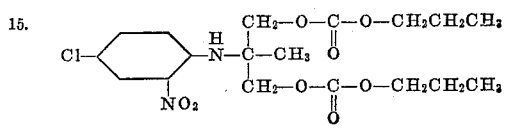

16. 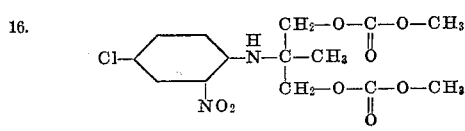

As previously indicated the new nitroaminobenzene ester compounds of our invention are of greatest utility for the coloration of textile materials comprising organic derivatives of cellulose, especially cellulose acetate textile materials. However, they may be used to color the other materials named herein. The coloration produced by the new nitroaminobenzene ester compounds of our invention is yellow.

Typical organic derivatives of cellulose that can be colored include the hydrolyzed, as well as the unhydrolyzed, cellulose carboxylic esters, such as cellulose acetate, cellulose propionate and cellulose butyrate, and the hydrolyzed, as well as the unhydrolyzed mixed cellulose carboxylic esters, such as cellulose acetate propionate and cellulose acetate butyrate, and the cellulose ethers such as methyl cellulose, ethyl cellulose and benzyl cellulose.

The nitroaminobenzene ester compounds of our invention are, for the most part, relatively insoluble in water and, accordingly, they may be advantageously directly applied to the textile material undergoing coloration in the form of an aqueous suspension which can be prepared by grinding the dye to a paste, in the presence of a sulfonated oil, soap, or other suitable dispersing agent and dispersing the resulting paste in water. In some instances, the compounds may possess sufficient solubility in water to render the use of a dispersing agent unnecessary. Generally speaking, however, the use of a dispersing agent is desirable.

Direct dyeing operations can, with advantage, be conducted at temperatures of about 75° to 85° C., but any suitable temperature may be used. Thus, the textile material to be dyed or colored is ordinarily added to the dye bath at a temperature lower than that at which the main portion of the dyeing is to be effected, a temperature of from 45° to 55° C., for example, following which the temperature is raised to that selected for carrying out the operation. The temperature at which the dyeing operation is carried out will vary somewhat depending upon the particular material undergoing coloration. As is understood by those skilled in the art, the intensity of dyeing can be varied by varying the proportion of dye to the material undergoing coloration. Generally speaking, 1 to 3% by weight of dye to material is employed, although any desired proportions can be used.

Suitable dispersing agents are disclosed in our United States Patent 2,115,030, issued April 26, 1938. The process disclosed in this patent for the dyeing of cellulose acetate can be used in applying the dyes of the present invention to cellulose acetate. While a satisfactory method for dyeing has been disclosed herein, it will be understood that any other suitable methods for dyeing the non-vegetable textile materials named herein can be employed. Lacquers may be colored with the dye compounds of our invention by the methods customarily employed in the lacquer art.

We claim:

1. A compound having the general formula:

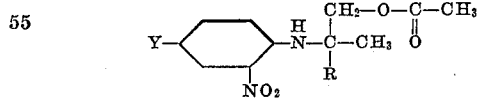

wherein Y represents a member selected from the group consisting of a chlorine atom and an N-ethyl sulfoneamide group and R represents a member selected from the group consisting of a methylol group and a

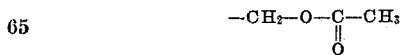

group.

2. The nitroaminobenzene compound having the formula:

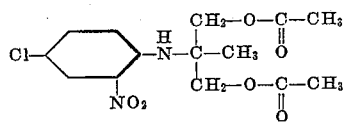

3. The nitroaminobenzene compound having the formula:
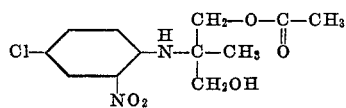
4. The nitroaminobenzene compound having the formula:
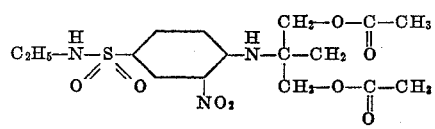
JAMES G. McNALLY.
JOSEPH B. DICKEY.
REFERENCES CITED
The following references are of record in the file of this patent:
UNITED STATES PATENTS
| Number | Name | Date |
|---|---|---|
| 2,338,380 | Hester et al. | Jan. 4, 1944 |
OTHER REFERENCES
Kremer et al., "J. A. C. S.," vol. 64 (1942), pp. 1285-1286.

Certificate of Correction

Patent No. 2,469,695.  May 10, 1949.

JAMES G. McNALLY ET AL.

It is hereby certified that errors appear in the printed specification of the above numbered patent requiring correction as follows:

Column 1, line 48, for that portion of the formula reading "monocyelic benzine" read *monocyclic benzene*; column 4, line 52, Example 1, for "amino" read *imino*; column 6, lines 4 and 5, Example 4, for "2-(iminopropanediol-1,3)" read *2-(2-iminopropanediol-1,3)*; column 11, line 11, claim 4, for that portion of the formula reading "N—C—CH$_2$" read *N—C—CH$_3$*;

and that the said Letters Patent should be read with these corrections therein that the same may conform to the record of the case in the Patent Office.

Signed and sealed this 1st day of November, A. D. 1949.

[SEAL]

THOMAS F. MURPHY,
*Assistant Commissioner of Patents.*